United States Patent
Vilonen et al.

(10) Patent No.: US 9,688,919 B2
(45) Date of Patent: Jun. 27, 2017

(54) PROCESS FOR PRODUCING HYDROCARBONS

(71) Applicant: UPM-Kymmene Corporation, Helsinki (FI)

(72) Inventors: Kati Vilonen, Kustavi (FI); Isto Eilos, Porvoo (FI); Jari Kotoneva, Lappeenranta (FI); Jaakko Nousiainen, Lappeenranta (FI)

(73) Assignee: UPM-KYMMENE CORPORATION, Helsinki (FI)

( * ) Notice: Subject to any disclaimer, the term of this patent is extended or adjusted under 35 U.S.C. 154(b) by 0 days.

(21) Appl. No.: 14/972,276

(22) Filed: Dec. 17, 2015

(65) Prior Publication Data

US 2016/0177188 A1    Jun. 23, 2016

(30) Foreign Application Priority Data

Dec. 19, 2014   (FI) ...................................... 20146127

(51) Int. Cl.

| | |
|---|---|
| *C07C 1/00* | (2006.01) |
| *C10G 1/00* | (2006.01) |
| *C10G 3/00* | (2006.01) |
| *C10L 1/04* | (2006.01) |
| *C10L 10/16* | (2006.01) |
| *C10G 45/58* | (2006.01) |
| *C10G 45/60* | (2006.01) |
| *C10G 45/64* | (2006.01) |
| *C10L 1/02* | (2006.01) |

(52) U.S. Cl.
CPC .................. *C10G 3/50* (2013.01); *C10G 3/44* (2013.01); *C10G 3/46* (2013.01); *C10G 3/48* (2013.01); *C10G 3/49* (2013.01); *C10G 45/58* (2013.01); *C10G 45/60* (2013.01); *C10G 45/64* (2013.01); *C10L 1/02* (2013.01); *C10L 1/04* (2013.01); *C10L 10/16* (2013.01); *C10G 2300/1014* (2013.01); *C10L 2200/0469* (2013.01); *C10L 2290/543* (2013.01); *Y02P 30/20* (2015.11)

(58) Field of Classification Search
CPC .................................... C07C 1/00; C10G 1/00
USPC ............... 585/240, 241, 242, 310, 317, 326
See application file for complete search history.

(56) References Cited

U.S. PATENT DOCUMENTS

| | | |
|---|---|---|
| 5,705,722 A | 1/1998 | Monnier et al. |
| 2015/0057474 A1* | 2/2015 | Nousiainen ............ C10G 21/20 585/16 |

FOREIGN PATENT DOCUMENTS

| | | |
|---|---|---|
| EP | 1741768 A1 | 1/2007 |
| WO | 2010046746 A3 | 4/2010 |
| WO | 2013156683 A1 | 10/2013 |
| WO | 2015075315 A1 | 5/2015 |

* cited by examiner

*Primary Examiner* — Thuan D Dang
(74) *Attorney, Agent, or Firm* — Cantor Colburn LLP

(57) ABSTRACT

The present invention relates to process for producing hydrocarbons, wherein starting material comprising tall oil material and polar co-feed, which polar co-feed comprises fatty acids, is diluted with a non-polar diluent to obtain feedstock, and said feedstock is catalytically hydroprocessed to obtain hydrocarbons, suitable as fuels, fuel blending components and fuel additives.

23 Claims, 1 Drawing Sheet

PROCESS FOR PRODUCING HYDROCARBONS

FIELD OF THE INVENTION

The present invention relates to a process for producing hydrocarbons from starting material comprising a combination of tall oil material and a polar co-feed. More particularly the invention relates to a process, where starting material comprising a combination of tall oil material and polar co-feed is catalytically hydroprocessed to obtain hydrocarbons, suitable as fuels, fuel blending components and fuel additives. The invention relates further to the of use starting material comprising tall oil material and polar co-feed in a process comprising catalytic hydroprocessing. The invention relates further to the use of the obtained hydrocarbons as fuels, fuel blending components and fuel additives.

BACKGROUND OF THE INVENTION

There is an increasing need for hydrocarbons suitable as liquid fuels as such, particularly as transportation fuels, or compatible with said fuels. Biofuels are typically manufactured from starting materials originating from renewable sources including oils and fats from plants, animals, algae, fish, and various waste streams and sewage sludge. The starting material is hydroprocessed in one or more steps to yield hydrocarbons.

Tall oil materials, such as crude tall oil may be used as starting materials in hydroprocessing. Tall oil materials are mixtures of a wide range of various compounds and they also contain hydrophilic components. Tall oil materials typically comprise compounds containing double bonds, which react readily under hydroprocessing conditions and yield polymeric compounds, which decrease hydrocarbon yields and cause catalyst inactivation. These events necessitate frequent shut-downs of the process and increases significantly the costs.

Despite the ongoing research and development of processes for the manufacture of liquid fuels, there is still a need to provide an improved process for producing hydrocarbons useful as liquid fuels or fuel blending components, from tall oil materials.

SUMMARY OF THE INVENTION

An object of the invention is to provide an improved process for producing hydrocarbons from starting materials comprising tall oil materials.

Another object of the invention is to provide a process where starting material comprising tall oil material and polar co-feed is catalytically hydroprocessed to obtain hydrocarbons, suitable as fuels, fuel blending components and fuel additives.

Another object of the invention is to use starting material comprising tall oil material and polar co-feed in a process comprising catalytic hydroprocessing to provide hydrocarbons in high yields and good quality.

The present invention generally concerns a process for producing hydrocarbons, where starting material comprising tall oil material and polar co-feed is catalytically hydroprocessed to obtain hydrocarbons, whereby the cold flow properties of the product comprising hydrocarbons are improved and aromatics content is decreased.

Particularly, the invention relates to a process for producing hydrocarbons, where starting material comprising tall oil material and polar co-feed, which polar co-feed comprises at least 75 wt % of C12-C22 fatty acids, is diluted with a non-polar diluent to obtain feedstock, the feedstock is hydroprocessed by a catalyst system comprising a combination of a HDO catalyst and HDW catalyst, at the temperature from 270 to 450° C. and under the pressure from 10 to 250 bar to obtain a hydroprocessing product, at least one hydrocarbon fraction boiling in the liquid fuel range is separated from the hydroprocessing product, and the non-polar diluent comprises the hydroprocessing product or hydrocarbon fraction or hydrocarbon blend or a combination thereof.

The invention also relates to the use of starting material comprising tall oil material and polar co-feed, which polar co-feed comprises at least 75 wt % of C12-C22 fatty acids, in catalytic hydroprocessing, where said starting material is diluted with a non-polar diluent to obtain feedstock, which is then subjected to hydroprocessing.

The present invention also provides hydrocarbons obtainable by said process.

The present invention also provides use of the hydrocarbons obtainable by said process fuels, fuel blending components and fuel additives.

Characteristic features of the invention are presented in the appended claims.

Definitions

The term "hydroprocessing" refers here to catalytic processing of feedstock originating from renewable sources by all means of molecular hydrogen.

Said hydroprocessing includes a catalytic process, which removes oxygen from organic oxygen compounds as water (hydrodeoxygenation, HDO), sulfur from organic sulfur compounds as dihydrogen sulfide (hydrodesulfurisation, HDS), nitrogen from organic nitrogen compounds as ammonia (hydrodenitrogenation, HDN), halogens, for example chlorine from organic chloride compounds as hydrochloric acid (hydrodechlorination, HDCl), by the means of molecular hydrogen. Said hydroprocessing also includes hydrogenation, which means here saturation of carbon-carbon double bonds by means of molecular hydrogen under the influence of a catalyst, hydrocracking, which refers to catalytic decomposition of organic hydrocarbon materials using molecular hydrogen at high pressures, and hydrodewaxing (HDW), which refers to catalytic treatment of organic hydrocarbon materials using molecular hydrogen at high pressures to reduce the wax and/or the content of high carbon number hydrocarbons by isomerization and/or cracking. Said hydroprocessing also includes hydroisomerization. Also ring opening reactions and saturation of aromatic compounds may take place. Said hydroprocessing also includes hydrodearomatization (HDA), which refers to catalytic treatment of organic hydrocarbon materials using molecular hydrogen at high pressures for converting aromatic compound to non-aromatic compounds.

Transportation fuels refer to fractions or cuts or blends of hydrocarbons having distillation curves standardized for fuels, such as for diesel fuel (middle distillate from 160 to 380° C., EN 590), gasoline (40-210° C., EN 228), aviation fuel (160 to 300° C., ASTM D-1655 jet fuel), kerosene, naphtha, etc.

Liquid fuels are hydrocarbons having distillation curves standardized for fuels.

DETAILED DESCRIPTION OF THE INVENTION

Figure 1:
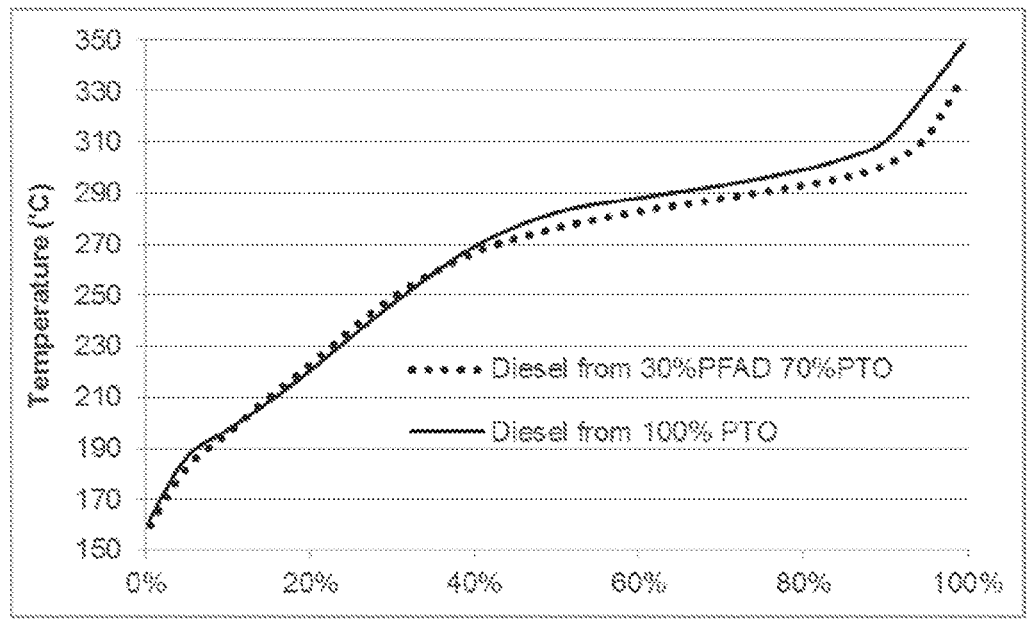
FIG. 1 shows distillation curves of diesel cuts obtained with 70 wt % of PTO+30 wt % of PFAD, and with 100 wt % PTO.

It was surprisingly found that several advantageous effects may be achieved when a combination of tall oil material and polar co-feed comprising at least 75 wt % of C12-C22 fatty acids is used as starting material in catalytic hydroprocessing, and the combination is diluted with non-polar diluent prior to the hydroprocessing. Thus improved hydrocarbon yields are obtained and the process can be run smoothly for long periods of time without interruptions. Further, reactions of double bonds in compounds contained in the tall oil material can be avoided Also the quality of the product can be improved. The test results showed that by using a starting material comprising polar co-feed, the cold flow properties of the product are significantly improved. In addition, the content of aromatic compounds are reduced.

The present invention relates to a process for producing hydrocarbons, where
- starting material comprising tall oil material and polar co-feed, which polar co-feed comprises at least 75 wt % of C12-C22 fatty acids, is diluted with a non-polar diluent to obtain feedstock,
- the feedstock is hydroprocessed by a catalyst system comprising a combination of a HDO catalyst and HDW catalyst, at the temperature from 270 to 450° C. and under the pressure from 10 to 250 bar to obtain a hydroprocessing product,
- at least one hydrocarbon fraction boiling in the liquid fuel range is separated from the hydroprocessing product, and
- the non-polar diluent comprises the hydroprocessing product or hydrocarbon fraction or hydrocarbon blend or a combination thereof.

The present invention relates also to hydrocarbon fractions boiling in the liquid fuel range, obtainable by the process.

The present invention relates also to the use of the obtained hydrocarbon fraction boiling in the liquid fuel range as diesel fuel, gasoline, naphtha, aviation fuel, kerosene, or as blending components or additives for these fuels, or as solvents.

The present invention also relates to the use of starting material comprising tall oil material and polar co-feed, which polar co-feed comprises at least 75 wt % of C12-C22 fatty acids, in catalytic hydroprocessing, where the starting material is diluted with a non-polar diluent to obtain feedstock, which is then subjected to hydroprocessing by a catalyst system comprising a combination of a HDO catalyst and HDW catalyst, at a temperature of 270-450° C. and under the pressure of 10-250 bar to obtain a hydroprocessing product, at least one hydrocarbon fraction boiling in the liquid fuel range is separated from the hydroprocessing product, and the non-polar diluent comprises the hydroprocessing product or hydrocarbon fraction or a hydrocarbon blend or a combination thereof.

In an embodiment, the starting material comprises 45-95 wt % of the tall oil material, and 5-55 wt % of the polar co-feed. Suitably the starting material comprises 50-90 wt % of the tall oil material and 10-50 wt % of the polar co-feed.

Tall Oil Material

Tall oil material is renewable starting material, which comprises a mixture of plant derived compounds obtained as a by-product from the forest industry, typically from pine and spruce trees. Tall oil material refers to crude tall oil (CTO) and purified tall oil (PTO). CTO is derived from the chemical pulping of woods. PTO is typically purified CTO. Tall oil is generally composed of a mixture of resin acids, fatty acids, alcohols, neutral substances including sterols and esters, unsaponifiable matter and non-acid materials.

Crude tall oil is mainly composed of both saturated and unsaturated oxygen-containing organic compounds such as unsaponifiable matter, neutral substances including sterols and esters, resin acids (mainly abietic acid and its isomers), fatty acids (mainly palmitic acid, linoleic acid, oleic acid and linolenic acid), fatty alcohols, sterols and other alkyl hydrocarbon derivatives. The handling and cooking of the wood causes break down of the triglyceride structures and hence CTO does not contain any significant amounts of triglycerides. Typically, CTO contains some amounts of impurities such as inorganic sulfur compounds, metals, Na, K, Ca and phosphorus. The composition of the CTO varies depending on the specific wood species.

Tall oil material may be purified prior to hydroprocessing, particularly prior to diluting with the non-polar diluent and subjecting to catalytic hydroprocessing. Said purification facilitates the performance of the catalytic hydroprocessing. Purification of tall oil material can be accomplished in any appropriate manner, such as by means of washing with washing liquid, filtering, distillation, degumming, depitching, and evaporating. Also, a combination of the above mentioned purification methods can be used.

According to a suitable embodiment purified tall oil (PTO) is used as tall oil material in the starting material of the present invention. Particularly suitably PTO obtained by evaporation from CTO is used.

According to a suitable embodiment the acid value of the tall oil material is 100-190.

Polar Co-Feed

The polar co-feed comprises at least 75 wt % of C12-C22 fatty acids. C12-C22 fatty acids refer here to free fatty acids, and to mixtures of free fatty acids and fatty acids in triglycerides, where said fatty acids have from 12 to 22 carbon atoms in their aliphatic chain.

Suitably the polar co-feed comprises at least 75 wt % of C14-C20 fatty acids, more suitably at least 75 wt % of C14-C18 fatty acids, particularly suitably at least 75 wt % of C16-C18 fatty acids.

According to one suitable embodiment the polar co-feed has acid value of 150-220.

According to one suitable embodiment the polar co-feed comprises at least 75 wt % of free fatty acids, more suitably 75-100 wt % of free fatty acids.

According to one suitable embodiment the polar co-feed comprises less than 70 wt % of compounds containing double bonds, i.e. unsaturated fatty acids.

According to one suitable embodiment the polar co-feed comprises 1-60 wt %, particularly suitably 1-50 wt % of C16 fatty acids.

According to one suitable embodiment the polar co-feed comprises 0-5 wt %, particularly suitably 0-1% of C17 fatty acids.

According to one suitable embodiment the polar co-feed comprises 30-98 wt %, particularly suitably 40-80 wt % of C18 fatty acids.

According to one suitable embodiment the polar co-feed comprises less than 15 wt %, particularly suitably less than 12 wt % of C14 fatty acids, or C15 fatty acids, or a mixture of C14 and C15 fatty acids.

According to one suitable embodiment the polar co-feed comprises less than 7 wt % of C13 or lower fatty acids. Lower fatty acids refer here to fatty acids having carbon number less than 13.

According to one suitable embodiment the polar co-feed comprises less than 30 wt % of C19 or higher fatty acids.

According to one suitable embodiment the polar co-feed comprises less than 65 wt % of compounds containing double bonds.

According to one suitable embodiment the polar co-feed comprises less than 700 ppm of metals (without purification). The metals comprise Cr, Ni, Fe, Cu and any combinations thereof.

According to one suitable embodiment the polar co-feed comprises less than 700 ppm of phosphorus.

According to one suitable embodiment the polar co-feed comprises less than 20 wt % of mono- di- and/or triglycerides. According to another embodiment the polar co-feed comprises less than 15 wt % of mono- di- and/or triglycerides. According to yet another embodiment the polar co-feed comprises less than 10 wt % of mono- di- and/or triglycerides. The rest of the polar co-feed comprises free fatty acids in said embodiments.

According to one suitable embodiment the polar co-feed comprises less than 20 wt % of any of resin acids, sterols, stanols, steryl esters or combinations thereof. According to another embodiment the polar co-feed comprises less than 15 wt % of any of resin acids, sterols, stanols, steryl esters or combinations thereof. According to yet another embodiment the polar co-feed comprises less than 10 wt % of any of resin acids, sterols, stanols, steryl esters or combinations thereof.

According to a suitable embodiment the polar co-feed comprises fatty acid containing fractions obtained from renewable material selected from products and residues obtained from refining and purifying processes of animal, algal, microbiological or plant originating materials including oils, fats and waxes, from products and residues obtained from mechanical treatment, physical treatment, or chemical treatment of animal, algal, microbiological or plant originating materials including oils, fats and waxes.

According to one embodiment the polar co-feed comprises tall oil fatty acid (TOFA) or crude tall oil fatty acid obtained from refining of tall oil. Fractional distillation of tall oil provides rosin acids, and further reduction of the rosin content provides tall oil fatty acids (TOFA) which consists mostly of oleic acid.

Examples of other suitable polar co-feeds include palm oil fatty acid distillate (PFAD), soy acid oil, tall oil crude fatty acid (residual fraction comprising some fatty acids, obtained from distillation of tall oil fatty acids), fatty acid containing residues obtained from degumming of plant oils, residues obtained from refining of plant oils, used cooking oils, animal fat residues and distillers corn oil (DCO).

Also any combinations of the above mentioned polar co-feeds may be used.

According to a suitable embodiment PFAD is used as polar co-feed. PFAD refers to non-edible residue generated during palm oil production. It is a by-product of physical refining of crude palm oil and it is typically composed of free fatty acids, glycerides, unsaponifiable matters, e.g. squalene, vitamin E, sterols and volatile substances; and metal impurities. PFAD comprises typically free fatty acids in an amount of at least 60 wt % or more, with palmitic (C16) and oleic (C18) acid as the major components.

The polar co-feed may be purified if necessary. Examples of suitable purification methods include filtration, degumming, washing, evaporation and water removal.

Non-Polar Diluent

Non-polar diluent is understood here to mean a hydrocarbon product, hydrocarbon fraction, hydrocarbon blend, or hydrocarbon mixture. The non-polar diluent may comprise hydroprocessing product (effluent) obtained from the hydroprocessing prior to fractionation, or a hydrocarbon fraction, or light hydrocarbon fraction separated from gaseous recycle streams or from the effluent, or a hydrocarbon fraction separated from another process, or a combination thereof. The non-polar diluent comprises suitably hydroprocessing product boiling in the range of 30-450° C. or hydrocarbon fraction boiling in the range of 150-450° C. or a combination thereof.

The non-polar diluent may comprise sulphur, aromatics and linear hydrocarbons.

The non-polar diluent is typically used in the ratio from 2:1 to 1:10 of starting material to diluent, suitably from 1:1 to 1:3. The non-polar diluent is necessary for controlling the exothermic hydroprocessing reactions and for avoiding corrosion problems, particularly in pre-reactor tubing.

In the present invention, the term "feedstock" refers to the starting materials entering the catalytic hydroprocessing, i.e. tall oil material, polar co-feed, and the non-polar diluent.

According to one embodiment the sodium content in the feedstock is not more than 170 ppm, suitably the sodium content in the feedstock is not more than 160 ppm, particularly suitably the sodium content in the feedstock is not more than 150 ppm, and particularly suitably the sodium content in the feedstock is not more than 140 ppm.

According to one embodiment the phosphorus content in the feedstock is not more than 80 ppm, suitably the phosphorus content in the feedstock is not more than 70 ppm, particularly suitably the phosphorus content in the feedstock is not more than 60 ppm, and particularly suitably the phosphorus content in the feedstock is not more than 50 ppm.

According to one embodiment the silicon content in the feedstock is not more than 50 ppm, suitably the silicon content in the feedstock is not more than 40 ppm, particularly suitably the silicon content in the feedstock is not more than 35 ppm, and particularly suitably the silicon content in the feedstock is not more than 32 ppm.

Purification of Tall Oil Material

The tall oil material may be purified before it is subjected to catalytic hydroprocessing. Said purification facilitates the performance of the process of the invention. Purification can be accomplished in any appropriate manner, such as by means of washing with washing liquid, filtering, distillation, degumming, depitching, and evaporating. Also, a combination of the above mentioned purification methods can be used.

In one embodiment tall oil material (crude tall oil), is subjected to evaporative treatment whereby purified tall oil material (PTO) is obtained. The content of harmful substances, such as metal ions, sulfur, phosphorus and possible lignin residuals is reduced by the purification and as much as possible of valuable components, such as neutral components of the tall oil are kept in the purified material. Purification of the feed also enhances catalyst performance and lifetime. In the purification of crude tall oil light components and heavy components such as tall oil pitch can be removed.

In an embodiment the purification of CTO is provided by evaporation using a series of two or more evaporators at elevated temperatures, and reduced pressures may be used. The multi-step evaporation makes it possible to accomplish the evaporation in such a manner that the amount of residue removed by the purification is very small, typically ranging from 5 wt % to 15 wt %.

According to one embodiment the purification of CTO is performed by using a combination of a heater and one or more evaporators. In this embodiment the tall oil material is first heated up under vacuum. A suitable temperature is from 150 to 230° C. under a pressure of 40 to 80 mbar. A gas phase containing light components (such as crude sulfate turpentine originating from tall oil) and water is separated from a liquid phase. The liquid phase is directed to one or more evaporators for further purification. The one or more evaporators may be any of the evaporators described below, using conditions suggested below.

According to another embodiment the purification of CTO is performed by using two or three evaporators in the purification. In this embodiment, the first evaporator is a thin film evaporator operating at a temperature from 150 to 200° C., and under a pressure of 10 to 20 mbar. The gas phase and water are separated from the liquid phase.

In the purification embodiment of CTO which uses two evaporators, the liquid fraction from the first evaporator is led to a second evaporator. A thin film evaporator or plate molecular still can be used. The second evaporator typically operates at a temperature from 300 to 390° C. and under a pressure of 0.01 to 15 mbar. The distillate, i.e. purified tall oil material is used in the starting material in the process.

In the purification embodiment of CTO that uses three evaporators, the liquid fraction from the first evaporator is led to a second evaporator, which is a thin film evaporator or a plate molecular still. Typical operating conditions of the second evaporator include evaporation at a temperature from 200 to 280° C. and a pressure from 5 to10 mbar. The third evaporator is a short path evaporator operating at a temperature from 280 to 360° C. and under a pressure of 0.1 to 5 mbar. The distillate, i.e. purified tall oil material obtained from the last evaporator is used in the starting material in the process.

The purified tall oil material and polar co-feed, i.e. the starting material is diluted with a non-polar diluent to obtain feedstock, which is heated and fed into a reactor system, where it is subjected to catalytic hydroprocessing on a catalyst capable of the hydroprocessing reactions.

Catalytic Hydroprocessing

The feedstock comprising tall oil material, the polar co-feed, which comprises at least 75 wt % of C12-C22 fatty acids, and the non-polar diluent is subjected to catalytic hydroprocessing in the presence of hydrogen and catalyst capable of effecting hydroprocessing reactions for providing hydrocarbons, suitable as fuels and other chemicals.

According to one embodiment the hydroprocessing is carried out in one step, where the hydroprocessing reactions are carried out in single phase and the molecular structure of the feedstock is modified suitable for fuel use and sulfur (S), nitrogen (N) and oxygen (O) are removed from the molecules. In parallel with the reaction of S, N, and O with hydrogen, the molecules are cracked and isomerized to provide hydrocarbons suitable for fuel use. It is to be noted that the single phase treatment does not mean that the catalyst beds are packed in a single reactor but they can also be placed in separate reactors arranged in series.

The hydroprocessing reactions are highly exothermic reactions and the temperature can be controlled by recycling the hydrocarbon product between one or more catalyst beds or introducing quench gas between the active catalyst beds or to one or more active catalyst beds as quench gas hydrogen may be used.

The hydroprocessing comprises at least one main reaction phase, where the hydroprocessing reactions such as hydrogenation, hydrodearomatization, hydrodenitrification, hydrodesulfurization hydrodeoxygenation, hydrocracking and hydrodewaxing take place, and additional optional pre-treatment phase upstream the main reaction phase and optional post-treatment phases downstream the main reaction phase.

The process is operated in a reactor system, which comprises at least one catalytically active guard bed phase and at least one catalytically active main reaction phase. The two phases may be physically combined into one unit. At least one of said phases comprises a catalyst bed, wherein hydrodeoxygenating (HDO) and hydrodewaxing (HDW) catalysts are combined with each other.

In one embodiment said catalytic hydroprocessing may be carried out in one stage where hydrodeoxygenation (HDO) and hydrodewaxing (HDW) are carried out in a hydroprocessing reactor system comprising one or more reactors. In the one stage operation, the feedstock flows through the entire hydroprocessing reactor system as a continuous flow from inlet to outlet without removal of any intermediate products, byproducts or streams. The guard bed phase(s) and main reaction phase(s) operate in a common reaction atmosphere under substantially the same pressure.

In an embodiment the main reaction phase comprises two or more main catalyst beds with their respective combinations of HDO and HDW catalysts. The HDO and HDW catalysts may be combined by being mixed with each other or they may be provided in separate layers or compartments within the same catalyst bed.

The reactor system also comprises at least one catalytically active guard bed phase upstream of the main reaction phase. The active catalyst materials are typically selected from Ni, Co, Mo, W, zeolites, $Al_2O_3$, $SiO_2$ and mixtures thereof. Also same catalyst material, as is used in the main reaction phase, can be used in the guard bed phase. There are two or more guard beds in in parallel or preferably, in series in the reactor system. The guard bed(s) may be combined in the same pressure vessel as the main catalyst beds or they may be provided in separate pressure vessel(s). The guard beds contain active catalyst material, as described above, for the removal of harmful substances from the feed. Hydrogen gas is fed into the guard bed phase either separately or premixed with the feed. The guard bed phase is pressurized and heated in order to provide the desired removal of metals, and phosphorus from the feed. In an embodiment at least one guard bed contains a combination of HDO catalyst and HDW catalyst.

In an embodiment HDO and HDW catalysts are combined in two or more catalyst beds of the reactor system. Typically one of said catalyst beds is located in a guard bed phase and another one is located in a main phase. In a further embodiment at least two main catalyst beds comprise a combination of HDO and HDW catalysts.

From the guard bed phase the flow is fed to the main reaction phase. There may be several main catalyst beds operating in series or in parallel in the reactor system. Typically there are one or two main catalyst beds operating in series. In an embodiment the process is designed to operate in such a way that the feed passes through a series of main catalyst beds as a continuous flow without intermediate outlets for by-products or other side streams. Thus, the main reaction phase may comprise one pressure vessel, i.e. the main catalyst beds are provided in one pressure vessel, or it may be split into two or more pressure vessels where the catalyst beds are split among the several pressure vessels.

The first main catalyst bed in the flow direction typically contains a combination of HDO and HDW catalysts as described above. Additional hydrogen gas is fed to the main phase to provide sufficient reagent for the various hydroprocessing steps.

Since the catalysts are combined in the catalyst bed(s) hydrogenation, hydrodewaxing, hydrodeoxygenation, hydrodearomatisation, hydrodenitrification, hydrodesulfurization and hydrocracking take place simultaneously.

From the first catalyst bed in the main reaction phase the flow passes to the second catalyst bed, where the proportion of HDO catalyst is typically lower than in the first catalyst bed. In case there are only two catalyst beds in the reactor system, the second bed will comprise mainly or only HDW catalyst. In case there are several beds, the second bed will comprise also HDO catalyst but in a minor proportion compared to the first bed. Typically the last bed in the main catalyst bed series contains only HDW catalyst. This makes it possible to adjust the degree of isomerization and cracking to a suitable level according to the required ignition and cold flow properties of the fuel product.

Catalysts

The HDO catalyst can be any HDO catalyst known in the art for the removal of hetero atoms (O, S and N) from organic compounds. In an embodiment, the HDO catalyst is selected from a group consisting of catalysts comprising a metal selected from Ni, Mo and Co, and mixtures of Ni, Mo and Co, such as NiMo and CoMo. Suitably the HDO catalyst is a supported catalyst and the support can be any oxide. Typically said oxide is selected from $Al_2O_3$, $SiO_2$, $ZrO_2$, zeolites, zeolite-alumina, alumina-silica, alumina-silica-zeolite and activated carbon, and mixtures thereof.

In an embodiment, the catalyst comprises solid particles of $NiMo/Al_2O_3$ or $NiMo/SiO_2$. In another embodiment the catalyst comprises $CoMo/Al_2O_3$ or $CoMo/SiO_2$. In a further embodiment the catalyst comprises $NiMoCo/Al_2O_3$ or $NiMoCo/SiO_2$. It is also possible to use a combination of HDO catalysts.

The HDO catalyst(s) is/are sulphided prior to start up. Adequate sulphidization during operation is usually provided by sulphur compounds contained in the feed material.

In an embodiment, the HDW catalyst is selected from hydrodewaxing catalysts typically used for isomerizing and cracking paraffinic hydrocarbon feeds. Examples of HDW catalysts include catalysts comprising Ni, W, or molecular sieves or combinations thereof. Suitably the HDW catalyst is a catalyst comprising NiW, zeolite with medium or large pore sizes, or a combination thereof. NiW has excellent isomerizing and dearomatizing properties and it also has the capacity of performing the hydrodeoxygenation and other hydrogenation reactions of biological feed materials. Catalyst comprising aluminosilicate molecular sieves and especially zeolites with medium or large pore sizes are also useful as HDW catalysts in the present invention. Typical commercial zeolites useful in the invention include for instance ZSM-5, ZSM-11, ZSM-12, ZSM 22, ZSM-23, ZSM 35, and zeolites of type beta and Y.

The HDW catalyst is suitably supported on an oxide support. Typically said oxide is selected from $Al_2O_3$, $SiO_2$, $ZrO_2$, zeolites, zeolite-alumina, alumina-silica, alumina-silica-zeolite and activated carbon, and mixtures thereof.

In an embodiment the HDW catalyst is selected from $NiW/Al_2O_3$ and $NiW/zeolite/Al_2O_3$.

In a specific embodiment, a catalyst bed of the main reaction phase of the hydroprocessing reactor system comprises a combination of sulfided HDO and HDW catalysts, wherein the HDO catalyst is $NiMo/Al_2O_3$ and the HDW catalyst is $NiW/zeolite/Al_2O_3$. The $NiMo/Al_2O_3$ catalyst mainly serves the purpose of hydrogenation, hydrodeoxygenation, hydrodesulfurization and hydrodenitrification. The $NiW/zeolite/Al_2O_3$ catalyst mainly serves the purpose of hydroisomerization, hydrogenation, hydrodearomatizing, and hydrocracking. However, as mentioned above, NiW has the capacity also for some hydrodeoxygenation, hydrodesulfurization and hydrodenitrification of the feedstock.

In an embodiment the HDW catalyst is mixed with the HDO catalyst in the first catalyst bed at the inlet end of the reactor system where the feed enters the main reaction phase. In case there are two or more catalyst beds in the main phase, the HDO and HDW catalysts are typically mixed in at least two of the main catalyst beds of the reactor system.

The proportion of HDO catalyst at the inlet end of the main reaction phase is typically higher than the proportion of HDW catalyst. In an embodiment the proportion of the HDW catalyst grows towards the outlet end of the reactor system. The last catalyst bed in the main reaction phase typically comprises only HDW catalyst.

In an embodiment the reactor system contains one main reaction phase. The main reaction phase comprises one or more catalyst beds. The first catalyst bed calculated in the flow direction of the main phase contains a combination of 50, 60, 70, 80, 90 or 95% by weight HDO catalyst and 5, 10, 20, 30, 40 or 50% by weight HDW catalyst. The last catalyst bed of the main phase contains 100% by weight HDW catalyst. In an embodiment there is a middle catalyst bed which contains 5, 10, 20, 30 or 50% by weight HDO catalyst and 50, 60, 70, 80, 90 or 95% by weight HDW catalyst.

In a specific embodiment the reactor system comprises a main phase with several catalyst beds operating in series. In an embodiment the first catalyst bed comprises 75 to 95% by weight $NiMo/Al_2O_3$ or $CoMo/Al_2O_3$ catalyst and 5 to 25% by weight $NiW/zeolite/Al_2O_3$ catalyst. The second catalyst bed comprises 2 to 15% by weight $NiMo/Al_2O_3$ or $CoMo/Al_2O_3$ catalyst and 85 to 98% by weight $NiW/zeolite/Al_2O_3$ catalyst. The third and fourth catalyst beds both comprise 100% $NiW/Al_2O_3$ or $NiW/zeolite/Al_2O_3$ catalyst.

Hydroprocessing Conditions

The hydroprocessing is carried out under a pressure from 10 to 250 bar, preferably from 80 to 110 bar.

The hydroprocessing is carried out at a temperature in the range from 270° C. to 450° C., suitably from 290° C. to 410° C.

The WHSV of the feedstock varies between 0.1 and 5, and is preferably in the range of 0.3-0.7.

The ratio of $H_2$/feedstock depends on the feedstock and varies between 600 and 4000 Nl/l, suitably from 1300 to 2200 Nl/l.

LHSV (liquid hourly space velocity) of the feedstock is typically in the range of 0.01-10 $h^{-1}$, suitably 0.1-5 $h^{-1}$.

The product from the hydroprocessing reactor system is drawn off from the bottom of the reactor system. In one embodiment the product (effluent) is cooled and directed to a separator, where, water, light component comprising hydrogen, light hydrocarbons (C1-C5 hydrocarbons), gaseous fractions containing $H_2S$, CO and $CO_2$ are separated from the heavy component comprising >C5 hydrocarbons and some C1-C5 hydrocarbons. In an embodiment the light hydrocarbons and/or gaseous fractions separated from the process are directed to an amine scrubber, which removes $H_2S$ and $CO_2$ from the gaseous products. The scrubbed gases, comprising mainly hydrogen and some impurities, may be recycled to the process as feed hydrogen and quench gas.

The treatment of the feedstock with hydrogen, i.e. the hydroprocessing provides a mixture of gaseous and liquid hydrocarbons, water and some mostly gaseous by-products such as $H_2S$, CO and $CO_2$. The main hydroprocessing products are paraffinic hydrocarbons in the $C_{16}$-$C_{20}$ range. The long carbon chains of the fatty acids are isomerized, which improves the cold flow properties of the resulting fuel. In the present invention, the isomerization takes place before, after or simultaneously with the hydrodeoxygenation due to the combination of HDO and HDW catalysts and the packing of the catalyst material. Olefins and aromatic compounds are hydrogenated and fused ring systems are broken. This reduces the complexity of the compounds and improves the quality of the fuel. Cracking of large molecules, side chains and of some of the long chains occurs, results in an increase of smaller useful molecules but also causes an increase in light gas products (methane, ethane, propane and butane).

The liquid reaction products, i.e. the mixture of higher (>C5) hydrocarbons is subjected to separation, suitably using fractionation. Suitably the liquid reaction product (effluent) is fed to a separation column where different fuel grade hydrocarbon fractions are recovered.

Optionally, from the bottom of the separation column (distillation column), heavier hydrocarbons boiling at a temperature above 380° C. may be recycled back to the inlet end of the apparatus and mixed into the feed before the guard bed phase.

The liquid hydrocarbon mixture obtained from the reactor system includes middle distillate fraction having boiling point from 160° C. to 380° C., meeting characteristics of the specification of EN 590 diesel. Also hydrocarbon fractions distilling at temperatures ranging from 40° C. to 210° C. can be recovered. These fractions are useful as high quality gasoline fuel and/or naphtha fuel, or as blending components for these fuels. Additionally, fraction suitable as solvents, aviation fuels, kerosene etc. may be obtained. Thus, the process produces paraffinic fuel or fuel components which is/are similar to EN 590 diesel and which has/have low aromatic content, high cetane number and acceptable cold flow properties.

The process for producing hydrocarbons from feedstock comprising tall oil material, polar co-feed and non-polar diluent provides several advantages. Hydrophilic components, such as neutral components including sterols and polymeric esters in the tall oil material can be maintained in the feedstock and utilized as valuable starting material. Further, the reactions of double bonds can be decreased. When using the polar co-feed surprisingly good cold flow properties (CP cloud point and CFPP could filter plugging point) can be achieved even when carrying out the process at moderate reaction temperatures. Further, a product with lower aromatics content is obtained. The process can be run for much longer periods of time without interruptions or shut downs, and thus significant savings can be achieved. Further the hydrocarbon yields are improved.

EXAMPLES

The following examples are illustrative embodiments of the present invention, as described above, and they are not meant to limit the invention in any way. The invention is illustrated also with reference to the figures.

Example 1

Hydroprocessing Feedstock Comprising Purified Tall Oil, Palm Oil Fatty Acid Distillate (PFAD) and Non-Polar Diluent The fatty acid content in the PFAD is shown in Table 1 below. PFAD typically contains about 90% by weight of free fatty acids, the remaining fatty acids being bound in triglycerides.

TABLE 1

|  | <C14 FA | C14 FA | C16 FA | C18 FA | C20 FA | >C20 |
|---|---|---|---|---|---|---|
| PFAD | <1% | 1% | 46% | 51% | <1% | <1% |

FA = fatty acid

Two runs with starting material comprising 30 wt-% of palm oil fatty acid distillate (PFAD containing about 90 wt % of free fatty acids having acid value of 177) and 70 wt-% of purified tall oil (PTO containing 42 wt % fatty acids and 25 wt % of resin acids and having acid value of 147) were hydroprocessed with a pilot reactor. The reactor contained a catalyst packing containing sulfided HDO catalyst (NiMo/$Al_2O_3$) and HDW catalyst (NiW/$Al_2O_3$). The hydroprocessing was conducted at an average temperature of 352 and 355° C. and under the pressure of 90 bar. Hydrotreated product was used as the non-polar diluent and the starting material:diluent ratio was 1:2. The resulting hydroprocessing product was fractionated to diesel cut. As a reference, two runs with PTO only were carried out. Product properties of the obtained diesel cuts produced from 30% PFAD+70 wt % of PTO, are presented in Table 2, and product properties of the obtained diesel cuts produced from 100 wt % PTO are presented in Table 3.

TABLE 2

|  | unit | method | 30 wt % PFAD 70 wt % PTO | 30 wt % PFAD 70 wt % PTO |
|---|---|---|---|---|
| Feedstock |  |  |  |  |
| Average catalyst bed temperature | ° C. |  | 352 | 355 |
| iso/n ratio (C10-C25) |  | GC-FID | 2.5 | 3.2 |
| Yield, gases | % feed | internal | 10 | 11 |
| Yield, naphtha (C5-C9) | % feed | internal | 19 | 24 |
| Yield, diesel (C10-C25) | % feed | internal | 62 | 58 |
| Yield, water | % feed | internal | 7 | 7 |
| Diesel cuts |  |  |  |  |
| Carbon, C | % | ASTM D 5291 | 84.5 | 84.6 |
| Hydrogen, H | % | ASTM D5291 | 14.8 | 14.7 |
| Oxygen, O | % |  | <0.05 | <0.05 |

TABLE 2-continued

|  | unit | method | 30 wt % PFAD 70 wt % PTO | 30 wt % PFAD 70 wt % PTO |
|---|---|---|---|---|
| Nitrogen, N | mg/kg | ASTM D5762 | 0.2 | 0.2 |
| Sulphur, S | mg/kg | EN ISO 20846 | 8 | 8 |
| Density, 15° C. | g/cm$^3$ | EN ISO 12185 | 0.79 | 0.79 |
| Flash point | ° C. | 2719 | 61 | 67 |
| Cloud point | ° C. | ISO 3015 | −6 | −9 |
| Could filter plugging point | ° C. | SFS-EN 116 | −11 | −13 |
| Monoaromatics | wt % | EN 12916 | — | 0.6 |
| Total aromatics | wt % | EN 12916 | — | 0.6 |

TABLE 3

|  | unit | method | 100 wt % PTO | 100 wt % PTO |
|---|---|---|---|---|
| Feedstock |  |  |  |  |
| Average catalyst bed temperature | ° C. |  | 352 | 355 |
| iso/n ratio (C10-C25) |  | GC-FID | 2.3 | 2.9 |
| Yield, gases | % feed | internal | 10 | 11 |
| Yield, naphtha (C5-C9) | % feed | internal | 18 | 22 |
| Yield, diesel (C10-C25) | % feed | internal | 65 | 60 |
| Yield, water | % feed | internal | 7 | 7 |
| Diesel cuts |  |  |  |  |
| Carbon, C | % | ASTM D 5291 | 84.1 | 84.7 |
| Hydrogen, H | % | ASTM D5291 | 14.4 | 14.5 |
| Oxygen, O | % |  | <0.05 | <0.05 |
| Nitrogen, N | mg/kg | ASTM D5762 | 0.3 | 0.6 |
| Sulphur, S | mg/kg | EN ISO 20846 | 10 | 9 |
| Density, 15° C. | g/cm$^3$ | EN ISO 12185 | 0.81 | 0.81 |
| Flash point | ° C. | 2719 | 63 | 66 |
| Cloud point | ° C. | ISO 3015 | 0 | −2 |
| Could filter plugging point | ° C. | SFS-EN 116 | −7 | −10 |
| Monoaromatics | wt % | EN 12916 | 1.1 | 1.1 |
| Total aromatics | wt % | EN 12916 | 1.1 | 1.1 |

Based on diesel properties and yields presented in Tables 2 and 3 it can be seen that the addition of 30% PFAD feed to tall oil (PTO) resulted in a decrease in aromatic compounds, an increase in the amount of linear hydrocarbons and improved cold flow properties.

It can be seen on the tables 2 and 3, that the CP values are clearly better with 70 wt % PTO and 30% PFAD co-feed at the same reaction temperature and approximately same yields than with 100% PTO alone.

Non-aromatic nature of PFAD as a raw material decreases slightly the aromatic content of the product. Also density of diesel produced from PFAD-PTO mixture was slightly lower.

In FIG. 1 the distillation curves of diesel cut obtained in the example above (Table 2, dotted line) and reference cut (Table 3, straight line) are presented. From the distillation curves of the diesel the effect of 30% PFAD co-feed on the product properties can be seen. The addition of PFAD to the feed changes the shape of the distillation curve, decreasing the amount of high boiling compounds, which was already seen as improved cold flow properties.

Yield calculations in table 2 and 3 are based on the daily samples, both liquid and gaseous samples, taken from the reactor. Gases were analyzed with gas chromatograph (FID & TCD) and liquid hydrocarbons were analyzed with another FID-gas chromatograph. Results were combined and the weight of product water was also taken in to the consideration. Gases includes $H_2S$, CO, $CO_2$ and C1-C4 hydrocarbons, gasoline includes C5-C9 hydrocarbons and diesel C9-C25 hydrocarbons. The results are based on analyzed gasoline and diesel fractions, C9 hydrocarbons are divided between gasoline and diesel fractions.

Figure 2:
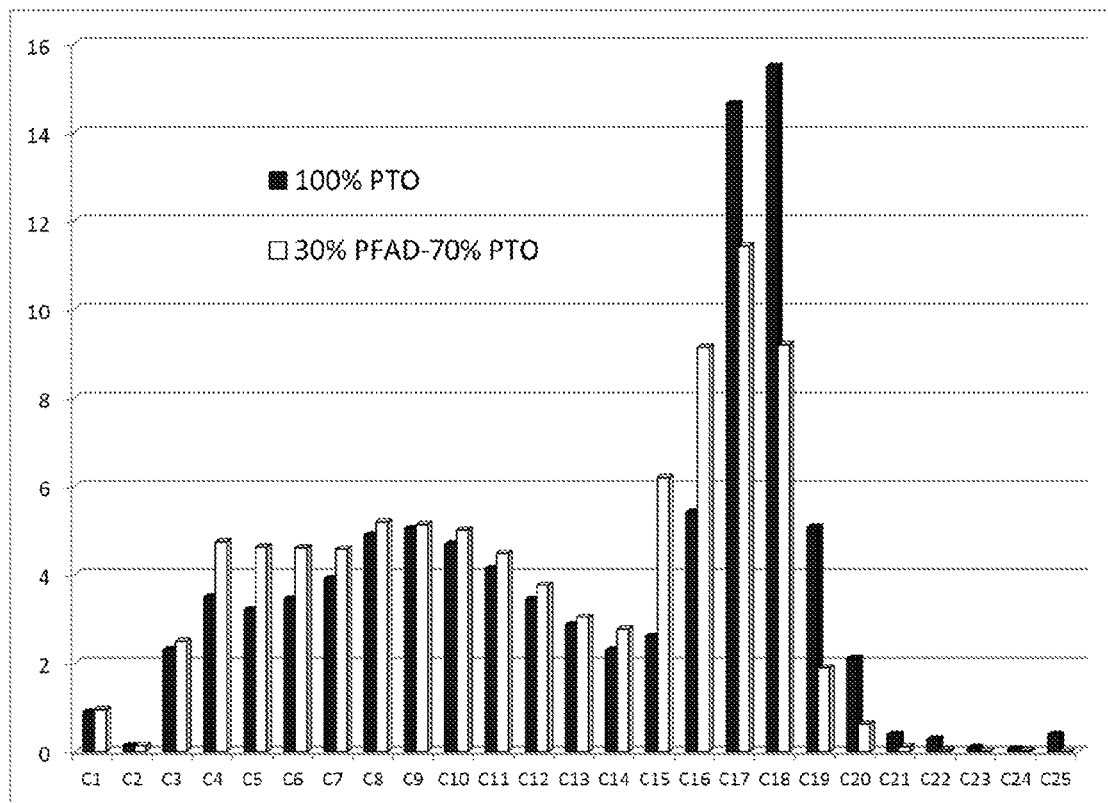
FIG. 2 illustrates hydrocarbon distributions of the hydroprocessed products.

FIG. 2 shows hydrocarbon distribution of the hydrotreated products obtained with 100 wt % PTO and 70 wt % PTO+30 wt % PFAD at the average temperature of 355° C. From FIG. 2 it can be seen that the amount of higher carbon number fractions is increased with PTO only.

As a summary of the results it can be stated that PFAD as a polar co-feed improves cold flow properties and decreases the aromatics content of diesel product. The shape of distillation curve is also better. Yields can be maintained at the levels obtained with 100% PTO if the reaction temperature is adjusted a few degrees lower in order to decrease the cracking effect, which is needed in less in case of smaller molecules in feed.

Further, the cold flow properties of the diesel product may be adjusted by controlling the process temperature.

The invention claimed is:

1. A process for producing hydrocarbons, wherein starting material comprising tall oil material and polar co-feed, which polar co-feed comprises at least 75 wt. % of C12-C22 fatty acids, is diluted with a non-polar diluent to obtain feedstock, the feedstock is hydroprocessed by a catalyst system comprising a combination of a HDO catalyst and HDW catalyst, at a temperature of 270-450° C. and under the pressure of 10-250 bar to obtain a hydroprocessing product, at least one hydrocarbon fraction boiling in the liquid fuel range is separated from the hydroprocessing product, and the non-polar diluent comprises the hydroprocessing product or hydrocarbon fraction or a hydrocarbon blend or a combination thereof.

2. The process according to claim 1, wherein the tall oil material is crude tall oil or purified tall oil.

3. The process according to claim 1, wherein the polar co-feed comprises at least 75 wt. % of C14-C20 fatty acids.

4. The process according to claim 1, wherein the polar co-feed comprises at least 75 wt. % of free fatty acids.

5. The process according to claim 1, wherein the polar co-feed has acid value of 150-220.

6. The process according to claim 1, wherein the polar co-feed is selected from the group consisting of palm oil fatty acid distillate, soy acid oil, tall oil fatty acid, crude tall oil fatty acid, fatty acid containing residues obtained from degumming of plant oils, residues obtained from refining of plant oils, used cooking oils, animal fat residues and distillers corn oil, and combinations thereof.

7. The process according to claim 1, wherein the starting material comprises 45-95 wt. % of the tall oil material, and 5-55 wt. % of the polar co-feed.

8. The process according to claim 1, wherein the starting material is diluted with the non-polar diluent in the ratio from 1:1 to 1:10 of starting material to diluent.

9. The process according to claim 1, wherein the feedstock has sodium content of not more than 170 ppm.

10. The process according to claim 1, wherein the feedstock has phosphorus content of not more than 80 ppm.

11. The process according to claim 1, wherein the feedstock has silicon content of not more than 50 ppm.

12. The process according to claim 1, wherein the non-polar diluent comprises hydroprocessing product boiling in the range of 30-450° C. or hydrocarbon fraction boiling in the range of 150-450° C., or a combination thereof, or the non-polar diluent comprises a hydrocarbon fraction separated from gaseous recycle streams, or a hydrocarbon fraction separated from another process, or a combination thereof.

13. The process according to claim 1, wherein the ratio of the starting material to non-polar diluent is from 2:1 to 1:10.

14. The process according to claim 1, wherein the tall oil material is crude tall oil and it is purified by evaporation comprising one, two or three evaporation steps.

15. The process according to claim 1, wherein the HDO catalyst is a catalyst comprising a metal selected from the group consisting of Ni, Co and Mo and combinations thereof.

16. The process according to claim 1, wherein the HDW catalyst a catalyst comprising NiW, or zeolite with medium or large pore sizes, or a combination thereof.

17. The process according to claim 1, wherein the tall oil material is purified tall oil.

18. The process according to claim 1, wherein the polar co-feed comprises at least 75 wt. % of C14-C18 fatty acids.

19. The process according to claim 1, wherein the polar co-feed comprises 75-100 wt. % of free fatty acids.

20. The process according to claim 1, wherein the starting material comprises 50-90 wt. % of the tall oil material, and 10-50 wt. % of the polar co-feed.

21. The process according to claim 1, wherein the feedstock has sodium content of not more than 160 ppm.

22. The process according to claim 1, wherein the feedstock has phosphorus content of not more than 70 ppm.

23. The process according to claim 1, wherein the feedstock has silicon content of not more than 40 ppm.

* * * * *